US012041416B2

(12) United States Patent
Ikeda et al.

(10) Patent No.: US 12,041,416 B2
(45) Date of Patent: Jul. 16, 2024

(54) PANEL SPEAKER

(71) Applicant: DENSO TEN Limited, Kobe (JP)

(72) Inventors: Shinichi Ikeda, Kobe (JP); Yasutaka Yamanaka, Kobe (JP)

(73) Assignee: DENSO TEN Limited, Kobe (JP)

( * ) Notice: Subject to any disclaimer, the term of this patent is extended or adjusted under 35 U.S.C. 154(b) by 265 days.

(21) Appl. No.: 17/715,107

(22) Filed: Apr. 7, 2022

(65) Prior Publication Data

US 2023/0060070 A1 Feb. 23, 2023

(30) Foreign Application Priority Data

Aug. 20, 2021 (JP) ................................ 2021-134512
Aug. 20, 2021 (JP) ................................ 2021-134513

(51) Int. Cl.
*H04R 17/00* (2006.01)
*H04R 1/02* (2006.01)
*H04R 7/04* (2006.01)

(52) U.S. Cl.
CPC ............ *H04R 17/00* (2013.01); *H04R 1/028* (2013.01); *H04R 7/045* (2013.01); *H04R 2400/11* (2013.01); *H04R 2499/15* (2013.01)

(58) Field of Classification Search
None
See application file for complete search history.

(56) References Cited

U.S. PATENT DOCUMENTS 6,396,197 B1 * 5/2002 Szilagyi ................ H04R 17/00 310/330
2005/0198761 A1 * 9/2005 Baskerville ............... B60S 1/02 15/250.19
2009/0097692 A1 * 4/2009 Sakamoto ............. H04R 17/00 381/388
2012/0099746 A1 * 4/2012 Fujise ................... H04R 17/00 381/190

FOREIGN PATENT DOCUMENTS

JP 2010-171927 A 8/2010

* cited by examiner

*Primary Examiner* — Walter F Briney, III
(74) *Attorney, Agent, or Firm* — Oliff PLC

(57) ABSTRACT

A panel speaker includes: a panel; a vibration actuator that vibrates the panel, the vibration actuator having first and second oppositely-facing surfaces, the first surface facing the panel; a bracket that is located between the first surface of the vibration actuator and the panel; a spacer that is located adjacent to the second surface of the vibration actuator, the spacer occupying a first area that is encompassed by a second area occupied by the bracket when the panel speaker is viewed in a direction that is perpendicular to a plane of the second surface; and a screw that passes through the spacer, the vibration actuator, and the bracket to fasten the spacer, the vibration actuator, and the bracket to the panel. The vibration actuator, disposed between the bracket and the spacer, is fastened by the screw to the panel.

6 Claims, 8 Drawing Sheets

PANEL SPEAKER

BACKGROUND OF THE INVENTION

Field of the Invention

The invention relates to a panel speaker.

Description of the Background Art

There is a display speaker that uses a display as a loudspeaker by vibrating a display panel of the display by an actuator (vibration actuator) that uses a piezoelectric element. In the display speaker, the vibration actuator is attached to a back surface of the display panel (vibration panel). Thus, vibration of the vibration actuator can be transmitted to the display panel.

The vibration actuator is installed to the display panel with, for example, a metal screw. By the metal screw, the vibration actuator is firmly fixed to the display panel. However, such a conventional fixing configuration of the actuator causes a problem of insufficient vibration of the display panel.

SUMMARY OF THE INVENTION

According to one aspect of the invention, a panel speaker includes: a panel; a vibration actuator that vibrates the panel, the vibration actuator having first and second oppositely-facing surfaces, the first surface facing the panel; a bracket that is located between the first surface of the vibration actuator and the panel; a spacer that is located adjacent to the second surface of the vibration actuator, the spacer occupying a first area that is encompassed by a second area occupied by the bracket when the panel speaker is viewed in a direction that is perpendicular to a plane of the second surface; and a screw that passes through the spacer, the vibration actuator, and the bracket to fasten the spacer, the vibration actuator, and the bracket to the panel. The vibration actuator, disposed between the bracket and the spacer, is fastened by the screw to the panel.

Therefore, an object of the invention is to provide a panel speaker that effectively vibrates.

These and other objects, features, aspects and advantages of the invention will become more apparent from the following detailed description of the invention when taken in conjunction with the accompanying drawings.

DESCRIPTION OF THE EMBODIMENTS

Hereinafter, embodiments of the invention will be described with reference to the drawings. Configurations of the embodiments below are only examples and the invention is not limited to the embodiments below.

Herein described is a case in which a vibration actuator is provided to a display panel (vibration panel) of a display that is functioned as a display speaker. The display speaker is a device that vibrates the display panel by the vibration actuator (hereinafter also referred to simply as "actuator") to cause sound waves to be output (released) from the display panel. The display speaker is an example of the panel speaker. The panel speaker outputs sound by, for example, vibrating a flat panel, such as the display panel.

First Embodiment

Configuration Example

Figure 1:
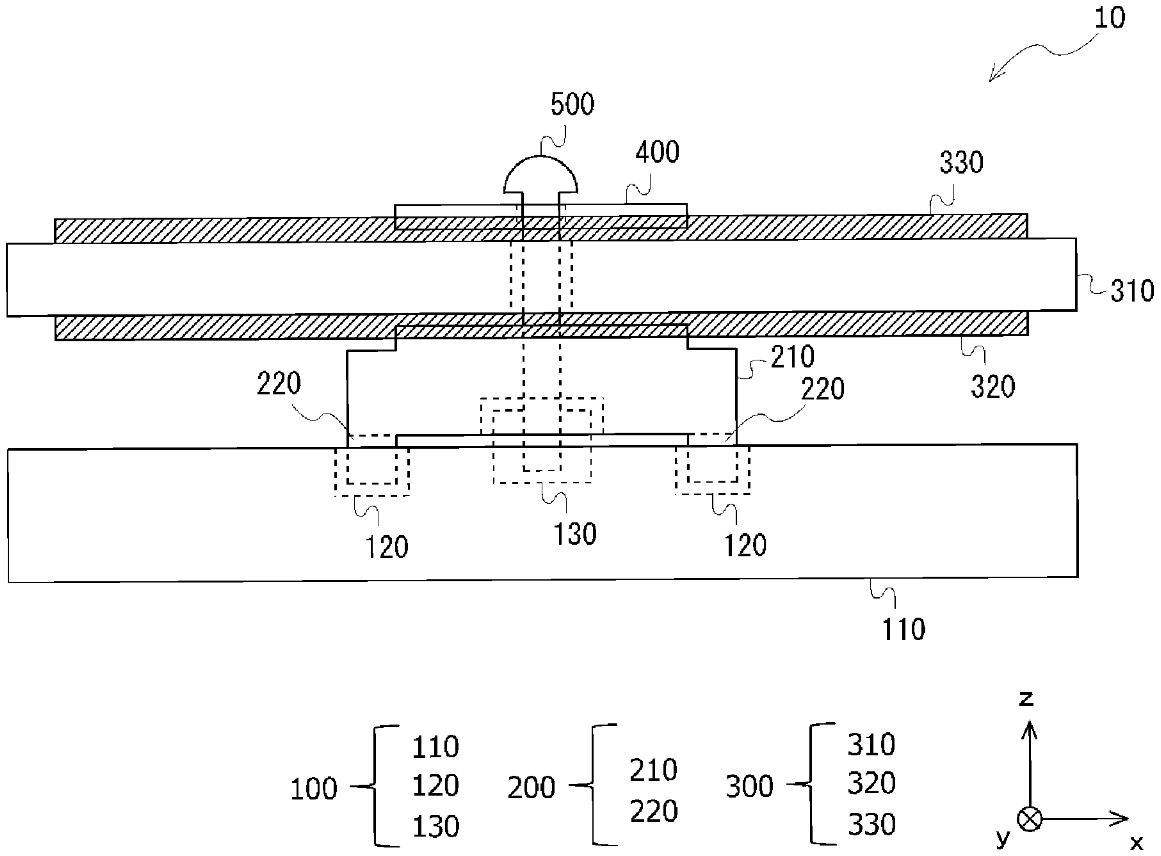
FIG. 1 shows a configuration example of a display speaker of a first embodiment.

FIG. 1 shows a configuration example of a display speaker 10 of this embodiment. FIG. 1 is a side view of the display speaker 10 viewed from a side of the display speaker 10. The display speaker 10 includes a display panel 100, a bracket 200, a vibration actuator 300, a spacer 400, and a screw 500.

Figure 2:
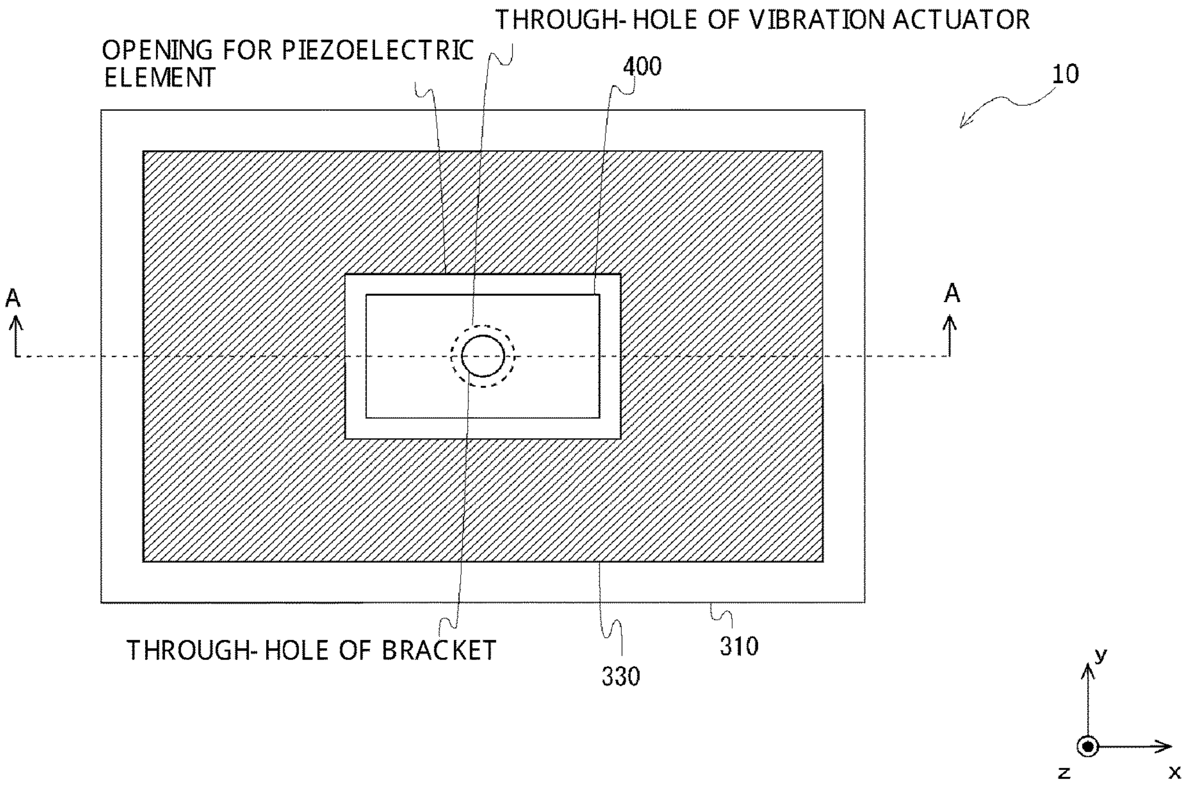
FIG. 2 is a top view of the display speaker when the display speaker is viewed above the display speaker.

FIG. 2 is a top view of the display speaker 10 when the display speaker 10 is viewed above the display speaker 10. In FIG. 2, the spacer 400 and the vibration actuator 300 are shown but the screw 500 and other elements are not illustrated.

Figure 3:
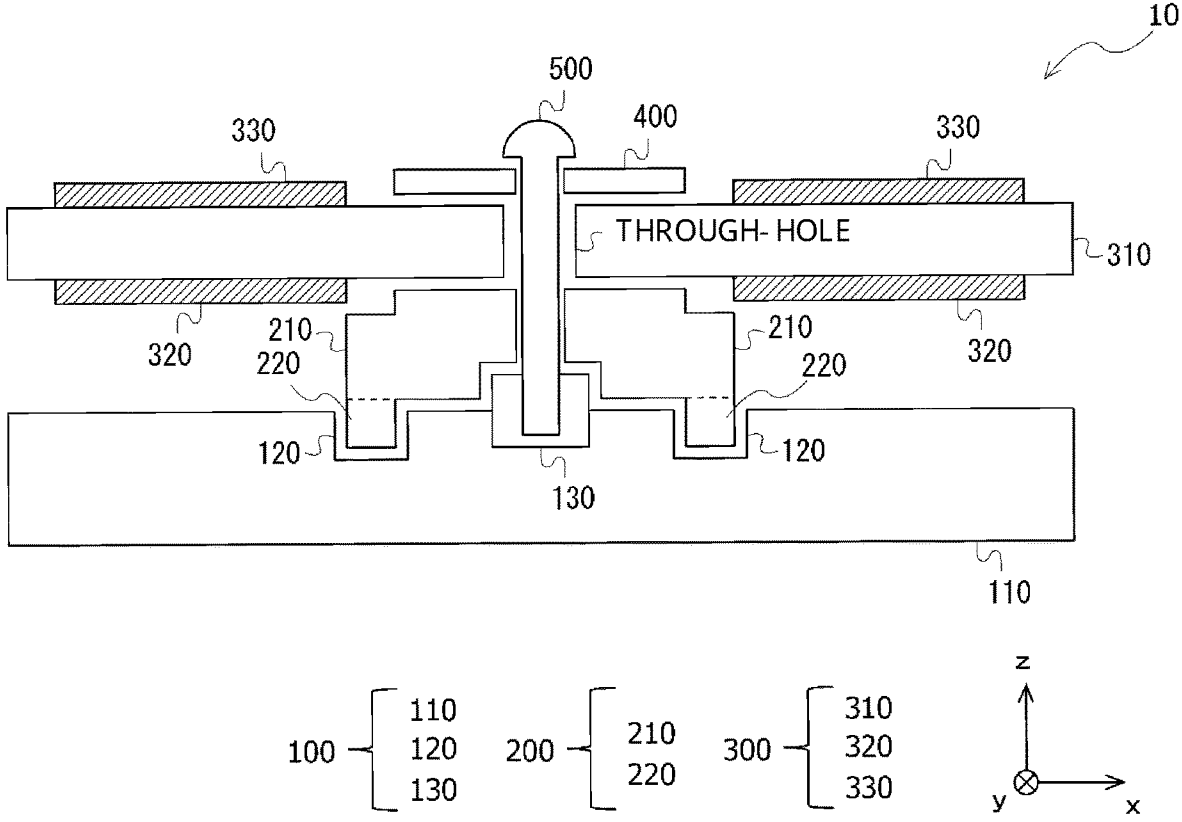
FIG. 3 is a cross-sectional view of the display speaker along a line A-A in FIG. 2.
Figure 4:
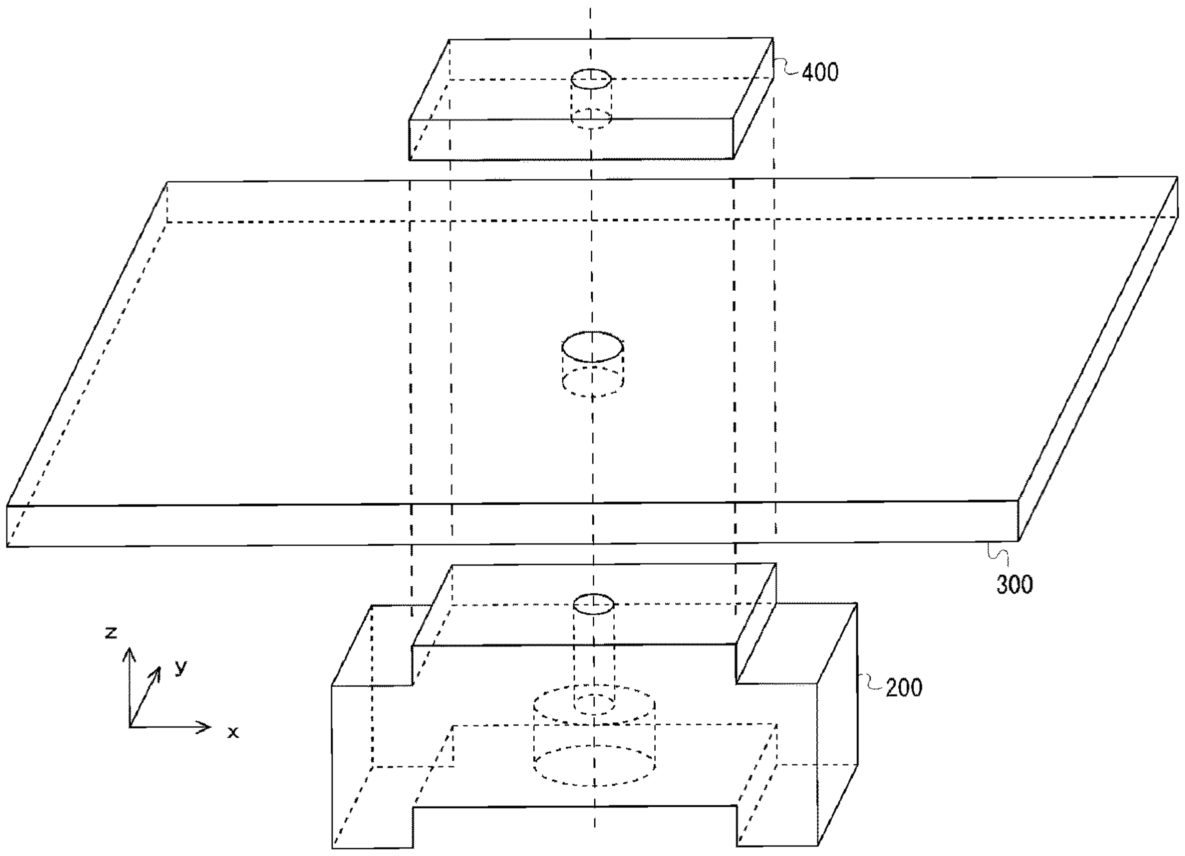
FIG. 4 is a disassembled perspective view of a bracket, a vibration actuator, and a spacer of the first embodiment.

FIG. 3 is a cross-sectional view of the display speaker 10 along a line A-A in FIG. 2. FIG. 4 is a disassembled perspective view of the bracket 200, the vibration actuator 300, and the spacer 400. The display speaker 10 is assembled in order from the display panel 100 to the bracket 200, the vibration actuator 300, and the spacer 400.

The display panel 100 includes a body 110, bracket mounting portion 120, and a screw mounting portion 130. The bracket 200 includes a bracket body 210 and a leg 220. The vibration actuator 300 includes a diaphragm 310, a piezoelectric element 320 that is provided to a surface (a first surface) of the diaphragm 310, and a piezoelectric element 330 that is provided to a surface (a second surface) of the diaphragm 310. The first surface faces the display panel and the second surface is an opposite surface to the first surface of the diaphragm 310. In the display speaker 10, the display panel 100, the bracket 200, the vibration actuator 300, and the spacer 400 are arranged in order and are fixed by the screw 500. A plurality of the brackets 200, the vibration actuators 300, the spacers 400, and the screws 500 may be used for one display panel 100. Herein, an x-direction shows a direction from a right side to a left side of FIG. 1. When FIG. 1 is drawn on a paper, a y-direction shows a direction from a front surface to a back surface of FIG. 1 on the paper and a z-direction shows a direction from a lower side to an upper side (from the display panel 100 to the vibration actuator 300) of FIG. 1 on the paper. A relation among the display speaker 10, the x-direction, the y-direction, and the z-direction is the bracket 200 on the other drawings attached to this specification. The screw 500 is installed parallel to the z-direction direction. The display panel 100 is an example of a panel. The leg 220 is an example of a protrusion.

The display panel 100 is a conductive metal panel and is connected to a ground. The body 110 is a plate member that functions as a diaphragm of the display speaker 10. The bracket mounting portion 120 is a concavity in which the leg 220 of the bracket 200 is installed. A shape of the bracket mounting portion 120 depends on a shape of the leg 220 of the bracket 200. The leg 220 of the bracket 200 is fitted into the bracket mounting portion 120 so that the bracket 200 does not rotate in the z-direction. The bracket mounting portion 120 extends from a surface of the body 110 on a side facing the vibration actuator 300, toward a surface of the body 110, opposite to the side facing the vibration actuator 300. The bracket mounting portion 120 is an example of an opening. The bracket 200 may include an opening like the bracket mounting portion 120, and the display panel 100 may include a protrusion like the leg 220. In that case, the protrusion of the display panel 100 may be fitted into the opening of the bracket 200. The screw mounting portion 130 is a fixation shaft for fixing the screw 500. The screw mounting portion 130 includes a screw hole for fixing the screw 500. The screw 500 is installed parallel to the z-direction in the screw mounting portion 130. The screw mounting portion 130 protrudes from the surface of the body 110 on the side facing the vibration actuator 300, toward the vibration actuator 300. The screw mounting portion 130 may not protrude from the surface of the body 110, on the side facing the vibration actuator 300. The display panel 100 is a display panel that is included in a liquid crystal panel, an organic EL (Electro-Luminescence) display, etc.

The bracket 200 includes the bracket body 210 and the leg 220. The bracket 200 transmits vibration of the vibration actuator 300 to the display panel 100. The bracket 200 is an electrical insulator. The bracket 200 is made of, for example, resin. The bracket body 210 of the bracket 200 is, for example, pillar-shaped or column-shaped, having an upper surface and a lower surface that are substantially parallel to each other. The upper surface is raised and is in contact with the vibration actuator 300, and the lower surface is in contact with the display panel 100. A shape of the upper surface may be different from a shape of the lower surface. The bracket body 210 includes a through-hole that extends between the upper surface and the lower surface. The screw 500 passes through the through-hole. A diameter of the through-hole is greater than a diameter of a shaft of the screw 500 on the surface in contact with the vibration actuator 300 and is greater than an outer diameter of the screw mounting portion 130 of the display panel 100 on the surface in contact with the display panel 100. The leg 220 extends from the lower surface of the bracket body 210 toward a direction of the display panel 100. The leg 220 is in a shape such that the leg 220 can be fitted into the bracket mounting portion 120 of the display panel 100. The leg 220 is in a columnar shape, such as column and quadrangular prism. The diaphragm 310 of the vibration actuator 300 is coupled to the display panel 100 via the bracket 200. A shape of the upper surface of the bracket body 210 is, for example, rectangle.

The diaphragm 310 of the vibration actuator 300 is a rectangle plate-shaped member, having a front surface (first surface) and a back surface (second surface) orthogonal to a thickness direction. The diaphragm 310 may be in a shape of circle or ellipse in a plane view. The diaphragm 310 may be in a different shape from circle or ellipse in the plane view if the different shape is bilaterally and vertically symmetrical. The front surface is substantially parallel to the back surface. A center area of the diaphragm 310 (the portion including a center of the first surface in the plane view) is exposed due to an opening of the piezoelectric element 320. Here, in a case where the shape of the diaphragm 310 is a rectangle, the center of the first (second) surface of the diaphragm 310 is an intersection of two diagonal lines of the rectangle. In a case where the shape of the diaphragm 310 is a circle or an ellipse, the center of the first (second) surface of the diaphragm 310 is a center of the circle or the ellipse. When the diaphragm 310 is in another shape, the center of the first (second) surface of the diaphragm 310 can be defined based on, for example, center of gravity. The diaphragm 310 is a conductor (e.g., metal). The diaphragm 310 is located such that the front surface of the diaphragm 310 is substantially parallel to the back surface of the display panel 100.

When the piezoelectric elements 320 and 330 are applied with voltage, the shapes of the piezoelectric elements 320 and 330 are changed according to the voltage. The piezoelectric elements 320 and 330 are made of a plate, such as ceramic, that shows piezoelectric effect. Electrodes are attached to each of the piezoelectric elements 320 and 330 to apply voltage. The piezoelectric element 320 is attached to the first surface of the diaphragm 310, and the piezoelectric element 330 is attached to the second surface of the diaphragm 310. Since the diaphragm 310 is the conductor, the diaphragm 310 functions as one of the electrodes of the piezoelectric element 320 and as one of the electrodes of the piezoelectric element 330. The piezoelectric element 320 includes the opening such that the center area of the diaphragm 310 is exposed when the diaphragm 310 is viewed from the first surface. The diaphragm 310 includes a through-hole, through which the screw 500 passes, in the center area. A diameter of the through-hole is greater than the diameter of the shaft of the screw 500 so as not to be in contact with the screw 500. Since the screw 500 and the diaphragm 310 do not contact with each other, an electrical short-circuit does not occur between the diaphragm 310 and the display panel 100. In other words, the diaphragm 310 is electrically insulated from the display panel 100. The diaphragm 310 includes the exposed portion in the center area of the first surface of the diaphragm 310 due to the opening of the piezoelectric element 320. The upper surface of the bracket body 210 of the bracket 200 is in contact with the opening. The opening is greater than the upper surface of the bracket body 210 of the bracket 200. The piezoelectric element 320 is not in contact with the bracket 200. The piezoelectric element 330 includes an opening such that the center area of the diaphragm 310 is exposed when the diaphragm 310 is viewed from the second surface. The diaphragm 310 includes the exposed portion in the center area of the second surface of the diaphragm 310 due to the opening of the piezoelectric element 330. A lower surface of the spacer 400 is in contact with the opening. The opening is greater than the lower surface of the spacer 400. The piezoelectric element 330 is not in contact with the spacer 400. The piezoelectric element 330 may not be attached to the diaphragm 310. The first and second surfaces are parallel to an xy plane.

The opening of the piezoelectric element 320 may be rectangle-shaped, square-shaped, circle-shaped, ellipse-shaped, etc. in accordance with the shape of the bracket 200. It is preferable that the opening of the piezoelectric element 320 is as small as possible for a greater area of the piezoelectric element 320. The greater the area of the piezoelectric element 320 is, the greater an output (maximum output) of the display speaker 10 can be. It is preferable that when the vibration actuator 300 is viewed from the first surface, an outer end of the piezoelectric element 320 is located inside an end of the diaphragm 310. If the outer end of the piezoelectric element 320 is located outside the end of the diaphragm 310, the piezoelectric element 320 is easily damaged. This is also true with the piezoelectric element 330 that is attached to the second surface of the diaphragm 310.

The spacer 400 is located between a head of the screw 500 and the diaphragm 310 of the vibration actuator 300. The spacer 400 is an electrical insulator. The spacer 400 is made of, for example, resin. It is preferable that a material of the spacer 400 is identical to a material of the bracket 200. It is also preferable that an elastic modulus of the spacer 400 is equal to an elastic modulus of the bracket 200. The spacer 400 is, for example, pillar-shaped or column-shaped, having an upper surface and a lower surface that are substantially parallel to each other. The upper surface is in contact with a lower portion of the head of the screw 500, and the lower surface is in contact with the diaphragm 310. An area of the upper surface may be different from an area of the lower surface. The spacer 400 includes a through-hole that extends between the upper surface and the lower surface. The screw 500 passes through the through-hole. A diameter of the through-hole is smaller than a diameter of the head of the screw 500 and is greater than the diameter of the shaft of the screw 500. It is preferable that the diameter of the through-hole of the spacer 400 is equal to the diameter of the through-hole of the bracket 200.

In a plane view, a shape of the lower surface of the spacer 400 is identical to the shape of the upper surface of the bracket 200. When the display speaker 10 is viewed from the z-direction, a location of the lower surface of the spacer 400 corresponds to a location of the upper surface of the bracket 200. The shape of a contact area of the spacer 400 with the diaphragm 310 is identical to the shape of a contact area of the bracket 200 with the diaphragm 310, and the spacer 400 and the bracket 200 face each other across the diaphragm 310. Thus, vibration of the vibration actuator can be even. When the bracket 200 and the spacer 400 are made of an identical material, the vibration of the vibration actuator can be more even.

The screw 500 passes through the through-hole of the spacer 400, the through-hole of the diaphragm 310 of the vibration actuator 300, and the through-hole of the bracket body 210 of the bracket 200 in order, and is fastened to the screw hole of the screw mounting portion 130 of the display panel 100. Thus, the spacer 400, the vibration actuator 300 and the bracket 200 are fixed to the display panel 100. Since the screw 500 is not in contact with the diaphragm 310, and the bracket 200 is the electrical insulator, an electrical short-circuit does not occur between the display panel 100 and the diaphragm 310. In other words, the display panel 100 is electrically insulated from the diaphragm 310. Therefore, if the diaphragm 310 cannot be earthed, voltage can be properly applied to the piezoelectric elements 320 and 330. Instead of the screw 500, a bolt or a nut may be used.

Here, when deflection vibration is generated such that the x-direction of the diaphragm 310 is arched in the z-direction, i.e., when the deflection vibration is generated that causes the x-direction of the diaphragm 310 to be arched in the z-direction by voltage applied to the piezoelectric elements 320 and 330, the deflection vibration is transmitted in the x-direction of the diaphragm 310. As shown in FIG. 1 and other drawings, a plurality of the legs 220 of the bracket 200 and a plurality of the bracket mounting portions 120 are located along a direction in which the deflection vibration of the diaphragm 310 is transmitted. In other words, the legs 220 of the bracket 200 and the bracket mounting portions 120 of the display panel 100 are located, when viewed from the z-direction, on a line that extends through a center of the screw 500 parallel to the x-direction. The diaphragm 310 is fixed in more points in a direction in which the deflection vibration is transmitted. Thus, the vibration is dispersed and the vibration of the diaphragm 310 can be transmitted to the display panel 100 more effectively in a wide bandwidth. For example, in an example shown in FIG. 1 and the other drawings show that distances to the two legs 220 from the through-hole for the screw 500 are equal. Thus, the vibration actuator 300 can vibrate the display panel 100 evenly. In the example in FIG. 1 and the other drawings, the two legs 220 and the two bracket mounting portions 120 are provided. However, the bracket 200 may be fixed to the display panel 100 with more than the two legs 220 and the two bracket mounting portions 120. Further, when viewed from the z-direction, the two legs 220 are located on the line extending parallel to the x-direction such that the distances from the center of the screw 500 to the two legs 220 are equal. Thus, the vibration of the diaphragm 310 can be evenly and effectively transmitted to the display panel 100.

Effects of the First Embodiment

The display speaker 10 of this embodiment includes the display panel 100, the bracket 200, the vibration actuator 300, the spacer 400, and the screw 500. The vibration actuator 300 includes the diaphragm 310, the piezoelectric element 320, and the piezoelectric element 330. The bracket 200, the vibration actuator 300, and the spacer 400 are fixed to the display panel 100 by the screw 500. The screw 500 passes through the through-holes of the bracket 200, the vibration actuator 300, and the spacer 400. The diaphragm 310 and the screw 500 are not in contact with each other so that an electrical short-circuit does not occur between the display panel 100 and the diaphragm 310. The upper surface of the bracket 200 and the lower surface of the spacer 400 face each other across the diaphragm 310. The external shape of the upper surface of the bracket 200 is identical to the external shape of the lower surface of the spacer 400. The material of the bracket 200 is identical to the material of the spacer 400. Thus, the vibration actuator 300 can evenly vibrate. The display speaker 10 can be vibrated by the vibration actuator 300 vibrating evenly. The display speaker 10 can output high quality sound by the vibration actuator 300 vibrating evenly.

Second Embodiment

Configuration Example

Figure 5:
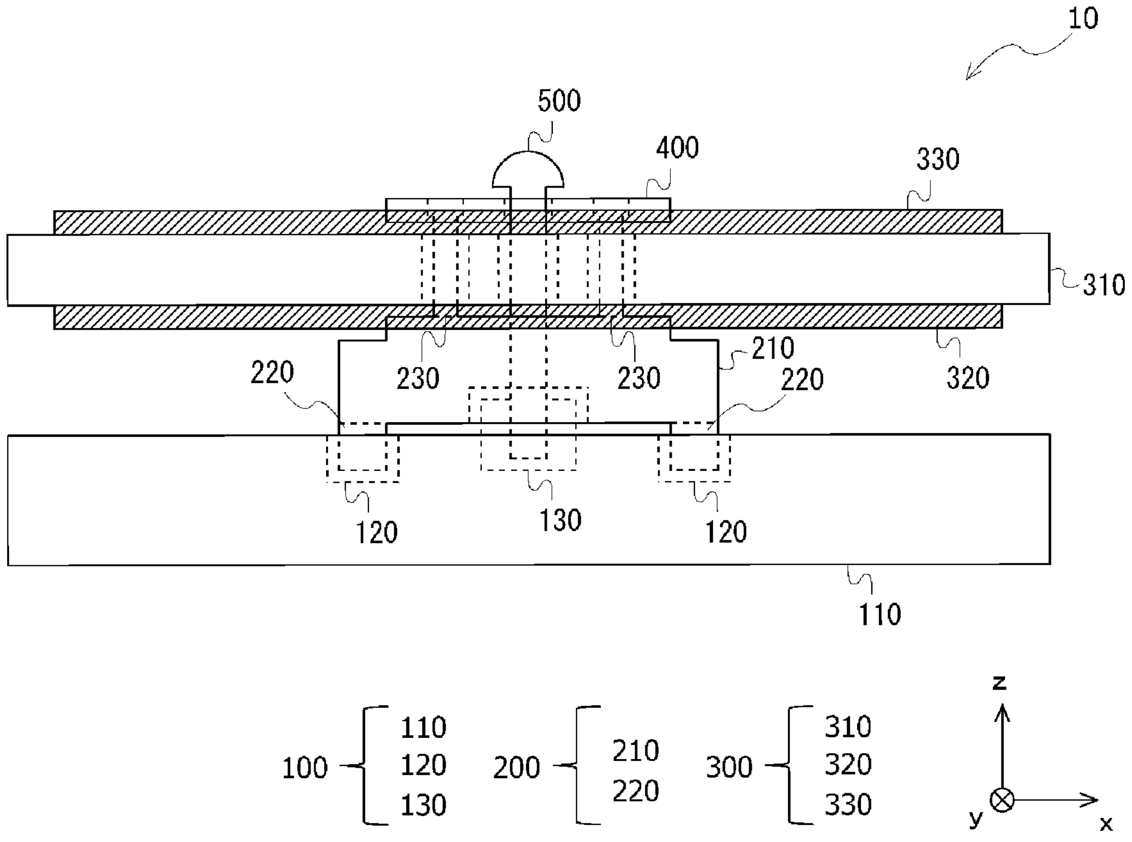
FIG. 5 shows a configuration example of a display speaker of a second embodiment.

FIG. 5 shows a configuration example of a display speaker 10 of this embodiment. Among configuration elements in the second embodiment, elements same as the elements in the first embodiment will be given with same reference numerals used in the first embodiment. FIG. 5 is a side view of the display speaker 10 viewed from a side of the display speaker 10. The display speaker 10 includes a display panel 100, a bracket 200, a vibration actuator 300, a spacer 400, and a screw 500.

Figure 6:
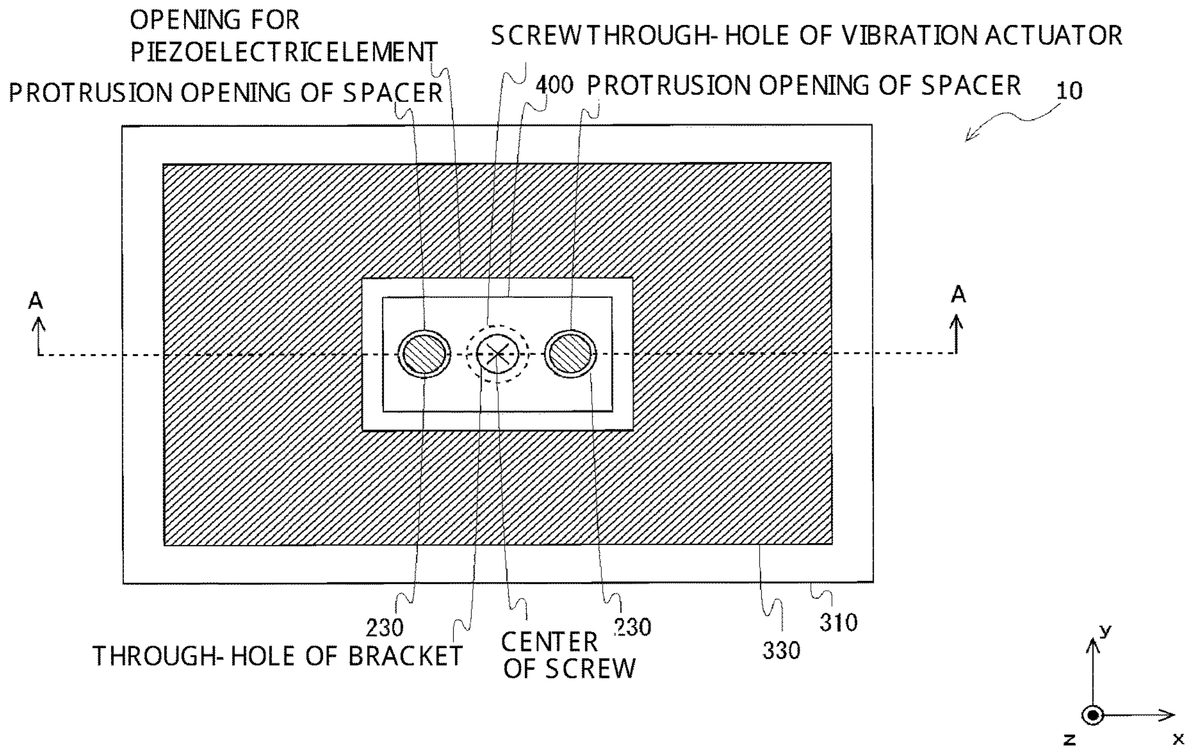
FIG. 6 is a top view of the display speaker of the second embodiment when the display speaker is viewed above the display speaker.

FIG. 6 is a top view of the display speaker 10 when the display speaker 10 is viewed above the display speaker 10. In FIG. 6, the spacer 400 and the vibration actuator 300 are shown but the screw 500 and other elements are not illustrated.

Figure 7:
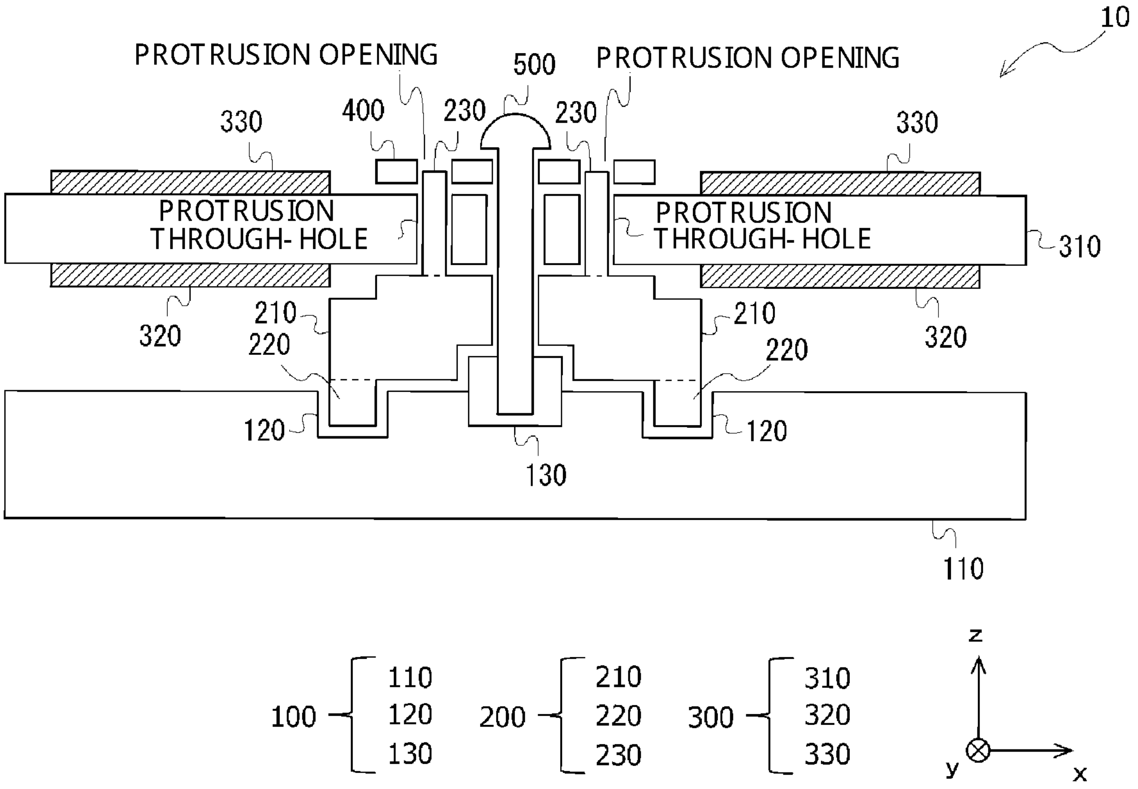
FIG. 7 is a cross-sectional view of the display speaker along a line A-A in FIG. 6.
Figure 8:
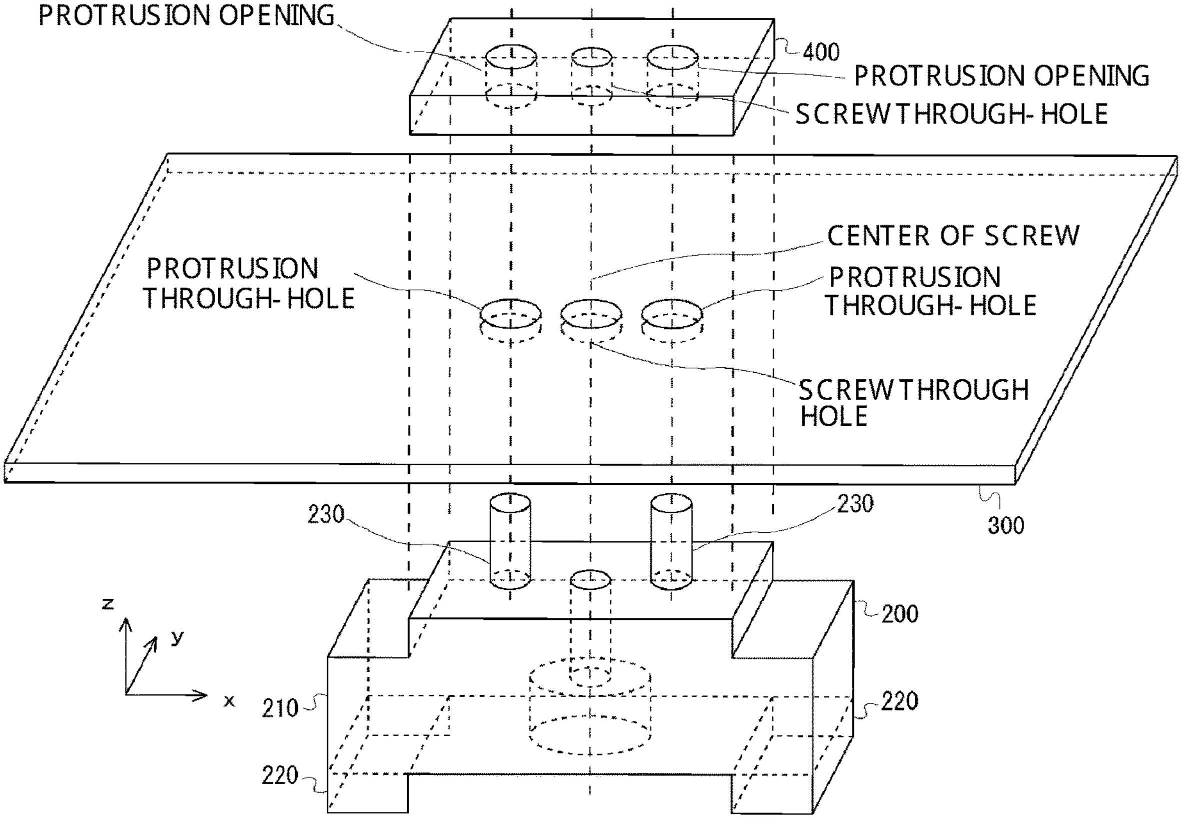
FIG. 8 is a disassembled perspective view of a bracket, a vibration actuator, and a spacer of the second embodiment.

FIG. 7 is a cross-sectional view of the display speaker 10 along a line A-A in FIG. 6. FIG. 8 is a disassembled perspective view of the bracket 200, the vibration actuator

300, and the spacer 400. The display speaker 10 is assembled in order from the display panel 100 to the bracket 200, the vibration actuator 300, and the spacer 400.

The display panel 100 includes a body 110, bracket mounting portion 120, and a screw mounting portion 130. The bracket 200 includes a bracket body 210, a leg 220 and a column 230. The vibration actuator 300 includes a diaphragm 310, a piezoelectric element 320 that is provided to a surface (a first surface) of the diaphragm 310, and a piezoelectric element 330 that is provided to a surface (a second surface) of the diaphragm 310. The first surface faces the display panel and the second surface is an opposite surface to the first surface of the diaphragm 310. In the display speaker 10, the display panel 100, the bracket 200, the vibration actuator 300, and the spacer 400 are located in order and are fixed by the screw 500. A plurality of the brackets 200, the vibration actuators 300, the spacers 400, and the screws 500 may be used for one display panel 100. Herein, an x-direction shows a direction from a right side to a left side of FIG. 5. When FIG. 5 is drawn on a paper, a y-direction shows a direction from a front surface to a back surface of FIG. 5 on the paper and a z-direction shows a direction from a lower side to an upper side (direction from the display panel 100 to the vibration actuator 300) of FIG. 5 on the paper. A relation among the display speaker 10, the x-direction, the y-direction, and the z-direction is same on the other drawings attached to this specification. The screw 500 is installed parallel to the z-direction direction. The display panel 100 is an example of a panel.

The display panel 100 includes the body 110, the bracket mounting portion 120, and the screw mounting portion 130. The display panel 100 is a conductive metal panel and is connected to a ground. The body 110 is a plate member that functions as a diaphragm of the display speaker 10. The bracket mounting portion 120 is a concavity in which the leg 220 of the bracket 200 is installed. A shape of the bracket mounting portion 120 depends on a shape of the leg 220 of the bracket 200. The leg 220 of the bracket 200 is fitted into the bracket mounting portion 120 so that the bracket 200 does not rotate in the z-direction. The bracket 200 may include an opening like the bracket mounting portion 120, and the display panel 100 may include a protrusion like the leg 220. In that case, the protrusion of the display panel 100 may be fitted into the opening of the bracket 200. The screw mounting portion 130 is a fixation shaft for fixing the screw 500. The screw mounting portion 130 includes a screw hole for fixing the screw 500. The screw 500 is installed parallel to the z-direction by the screw mounting portion 130. The screw mounting portion 130 protrudes from a surface of the body 110 on a side facing the vibration actuator 300, toward the vibration actuator 300. The screw mounting portion 130 may not protrude from the surface of the body 110 on the side facing the vibration actuator 300. The display panel 100 is a display panel that is included in a liquid crystal panel, an organic EL (Electro-Luminescence) display, etc.

The bracket 200 includes the bracket body 210, the leg 220 and the column 230. The bracket 200 may include a plurality of the legs 220 and a plurality of the columns 230. In an example shown in FIG. 5 and other drawings, the bracket 200 includes two legs 220 and two columns 230. The bracket 200 transmits vibration of the vibration actuator 300 to the display panel 100. The bracket 200 is an electrical insulator. The bracket 200 is made of, for example, resin. The bracket body 210 of the bracket 200 is, for example, pillar-shaped or column-shaped, having an upper surface and a lower surface that are substantially parallel to each other. The upper surface is in contact with the vibration actuator 300, and the lower surface is in contact with the display panel 100. A shape of the upper surface may be different from a shape of the lower surface. The bracket body 210 includes a screw through-hole that extends between the upper surface and the lower surface. The screw 500 passes through the screw through-hole. A diameter of the screw through-hole is greater than a diameter of a shaft of the screw 500 on the surface in contact with the vibration actuator 300 and is greater than an outer diameter of the screw mounting portion 130 of the display panel 100 on the surface in contact with the display panel 100. The legs 220 extend from the lower surface of the bracket body 210 toward a direction of the display panel 100. The legs 220 are in a shape such that the legs 220 can be fitted into the bracket mounting portions 120 of the display panel 100. The legs 220 are in a columnar shape, such as column and quadrangular prism. The columns 230 extend from the upper surface of the bracket body 210 toward a direction of the vibration actuator 300. The columns 230 are in a columnar shape, such as column and quadrangular prism. The columns 230 pass through through-holes for the protrusions (hereinafter "protrusion through-holes") of the diaphragm 310 of the vibration actuator 300. The columns 230 are fitted to openings of the spacer 400 for protrusions (hereinafter "protrusion openings"). The spacer 400 may include the columns 230 and the columns 230 of the spacer 400 may pass through the protrusion through-holes of the diaphragm 310 and may be fitted to protrusion openings of the bracket 200. In the example shown in FIG. 5 and the other drawings, distances from the columns 230 to (a center of) the screw through-hole are equal. In the example shown in FIG. 5 and the other drawings, the two columns 230 and the screw through-hole are located on a line parallel to the x-direction on the upper surface of the bracket body 210. In other words, the two columns 230 are arranged symmetrically about the screw 500. The diaphragm 310 of the vibration actuator 300 is coupled to the display panel 100 via the bracket 200. A shape of the upper surface of the bracket body 210 is, for example, rectangle.

The diaphragm 310 of the vibration actuator 300 is a plate member in a shape of rectangle, having a front surface (first surface) and a back surface (second surface) orthogonal to a thickness direction. The diaphragm 310 may be in a shape of circle or ellipse in a plane view. The diaphragm 310 may be in a different shape from rectangle, circle or ellipse in the plane view if the different shape is bilaterally and vertically symmetrical. The front surface is substantially parallel to the back surface. A center area of the diaphragm 310 (including a center of the first surface in the plane view) is exposed due to an opening of the piezoelectric element 320. Here, in a case where the shape of the diaphragm 310 is a rectangle, the center of the first (second) surface of the diaphragm 310 is an intersection of two diagonal lines of the rectangle. In a case where the shape of the diaphragm 310 is a circle or an ellipse, the center of the first (second) surface of the diaphragm 310 is a center of the circle or the ellipse. When the diaphragm 310 is in another shape, the center of the first (second) surface of the diaphragm 310 can be defined based on, for example, center of gravity. The diaphragm 310 is a conductor (e.g., metal). The diaphragm 310 is arranged such that the front surface of the diaphragm 310 is substantially parallel to the back surface of the display panel 100.

When the piezoelectric elements 320 and 330 are applied with voltage, the shapes of the piezoelectric elements 320 and 330 are changed according to the voltage. The piezoelectric elements 320 and 330 are made of a plate, such as ceramic, that shows piezoelectric effect. Electrodes are attached to each of the piezoelectric elements 320 and 330 to apply voltage. The piezoelectric element 320 is attached to the first surface of the diaphragm 310, and the piezoelectric element 330 is attached to the second surface of the diaphragm 310. Since the diaphragm 310 is the conductor, the diaphragm 310 functions as one of the electrodes of the piezoelectric element 320 and as one of the electrodes of the piezoelectric element 330. The piezoelectric element 320 includes the opening such that the center area of the diaphragm 310 is exposed when the diaphragm 310 is viewed from the first surface. The diaphragm 310 includes a screw through-hole in the center area, through which the screw 500 passes. A diameter of the screw through-hole is greater than the diameter of the shaft of the screw 500 so as not to be in contact with the screw 500. Since the screw 500 and the diaphragm 310 do not contact with each other, an electrical short-circuit does not occur between the diaphragm 310 and the display panel 100. Further, the diaphragm 310 includes the protrusion through-holes, through which the columns 230 of the bracket 200 pass, in a vicinity of the screw through-hole in the center area of the diaphragm 310. A diameter of the protrusion through-holes is greater than a diameter of the columns 230. The columns 230 may be in contact with the protrusion through-holes. The protrusion through-holes are positioned corresponding to positions of the columns 230 of the bracket 200. The diaphragm 310 includes the exposed portion in the center area of the first surface of the diaphragm 310 due to the opening of the piezoelectric element 320. The upper surface of the bracket body 210 of the bracket 200 is in contact with the opening. The opening is greater than the upper surface of the bracket body 210 of the bracket 200. The piezoelectric element 320 is not in contact with the bracket 200. The piezoelectric element 330 includes an opening such that a center area of the diaphragm 310 is exposed when the diaphragm 310 is viewed from the second surface. The diaphragm 310 includes the exposed portion in the center area of the second surface of the diaphragm 310 due to the opening of the piezoelectric element 330. The screw through-hole and the protrusion through-holes are provided in the exposed portion. In the example shown in FIG. 5 and the other drawings, distances from the protrusion through-holes to (the center of) the screw through-hole are equal. In the example shown in FIG. 5 and the other drawings, the two protrusion through-holes and the screw through-hole are located on a line parallel to the x-direction. In other words, the two protrusion through-holes are located symmetrically about the screw 500. A lower surface of the spacer 400 is in contact with the opening of the piezoelectric element 330. The opening is greater than the lower surface of the spacer 400. The piezoelectric element 330 is not in contact with the spacer 400. The piezoelectric element 330 may not be attached to the diaphragm 310. The first and second surfaces are parallel to an xy plane.

The opening of the piezoelectric element 320 may be rectangle-shaped, square-shaped, circle-shaped, ellipse-shaped, etc. in accordance with the shape of the bracket 200. It is preferable that the opening of the piezoelectric element 320 is as small as possible for a greater area of the piezoelectric element 320. The greater the area of the piezoelectric element 320 is, the greater an output (maximum output) of the display speaker 10 can be. It is preferable that when the vibration actuator 300 is viewed from the first surface, an outer end of the piezoelectric element 320 is located inside an end of the diaphragm 310. If the outer end of the piezoelectric element 320 is located outside the end of the diaphragm 310, the piezoelectric element 320 is easily damaged. This is also true with the piezoelectric element 330 that is attached to the second surface of the diaphragm 310.

The spacer 400 is located between a head of the screw 500 and the diaphragm 310 of the vibration actuator 300. The spacer 400 is an electrical insulator. The spacer 400 is made of, for example, resin. It is preferable that a material of the spacer 400 is identical to a material of the bracket 200. It is also preferable that an elastic modulus of the spacer 400 is equal to an elastic modulus of the bracket 200. The spacer 400 is, for example, pillar-shaped or column-shaped, having an upper surface and a lower surface that are substantially parallel to each other. The upper surface is in contact with a lower portion of the head of the screw 500, and the lower surface is in contact with the diaphragm 310. An area of the upper surface may be different from an area of the lower surface. The spacer 400 includes a screw through-hole that extends between the upper surface and the lower surface. The screw 500 passes through the screw through-hole. A diameter of the screw through-hole is smaller than a diameter of the head of the screw 500 and is greater than the diameter of the shaft of the screw 500. It is preferable that the diameter of the screw through-hole of the spacer 400 is equal to the diameter of the screw through-hole of the bracket 200.

The spacer 400 includes the protrusion openings on the lower surface. The columns 230 of the bracket 200 are put in the protrusion openings. The protrusion openings may be a through-hole extending from the lower surface through the upper surface or may not extend from the lower surface through the upper surface, i.e. may not be a through-hole. The columns 230 are fitted in the protrusion openings. A diameter of the protrusion openings is greater than a diameter of the columns 230. The columns 230 may be in contact with the protrusion openings. Positions of the protrusion openings correspond to positions of the columns 230 of the bracket 200. Here, the bracket body 210 of the bracket 200 includes the columns 230 on the upper surface, and the spacer 400 includes the protrusion openings, corresponding to the columns 230 of the bracket 200, on the lower surface. However, the spacer 400 may include protrusions on the lower surface, and the bracket body 210 of the bracket 200 may include protrusion openings on the upper surface. Each of the bracket body 210 of the bracket 200 and the spacer 400 may include protrusions and protrusion openings on the upper surface and the lower surface. In the example shown in FIG. 5 and the other drawings, distances from the protrusion openings to (the center of) the screw through-hole are equal. In the example shown in FIG. 5 and the other drawings, the two protrusion openings and the screw through-hole are arranged on a line parallel to the x-direction. In other words, the two protrusion openings are arranged symmetrically about the screw 500.

The screw 500 passes through the screw through-hole of the spacer 400, the screw through-hole of the diaphragm 310 of the vibration actuator 300, and the screw through-hole of the bracket body 210 of the bracket 200 in order, and is fastened to the screw hole of the screw mounting portion 130 of the display panel 100. Thus, the spacer 400, the vibration actuator 300 and the bracket 200 are fixed to the display panel 100. Since the screw 500 is not in contact with the diaphragm 310, and the bracket 200 is the electrical insulator, an electrical short-circuit does not occur between the display panel 100 and the diaphragm 310. Therefore, if the diaphragm 310 cannot be earthed, voltage can be properly applied to the piezoelectric elements 320 and 330. Instead of the screw 500, a bolt or a nut may be used.

Here, when deflection vibration is generated such that the x-direction of the diaphragm 310 is arched in the z-direction, i.e., when the deflection vibration is generated that causes the x-direction of the diaphragm 310 to be arched in the z-direction by voltage applied to the piezoelectric elements 320 and 330, the deflection vibration is transmitted in the x-direction of the diaphragm 310. As shown in FIG. 5 and the others, a plurality of the columns 230 are located along a direction in which the deflection vibration of the diaphragm 310 is transmitted. The protrusion through-holes of the diaphragm 310 and the protrusion openings of the spacer 400 are also arranged along the direction in which the deflection vibration of the diaphragm 310 is transmitted. In other words, the columns 230 of the bracket 200, the protrusion through-holes of the diaphragm 310 of the vibration actuator 300 and the protrusion openings of the spacer 400 are arranged, when viewed from the z-direction, on the line parallel to the x-direction through the center of the screw 500. The diaphragm 310 is fixed in more points in a direction in which the deflection vibration is transmitted. Thus, the vibration is dispersed and the vibration of the diaphragm 310 can be transmitted to the display panel 100 more effectively in a wide bandwidth. For example, in the example shown in FIG. 5 and the other drawings, distances to the two columns 230 from the screw through-hole are equal. Thus, the vibration actuator 300 can vibrate the display panel 100 evenly. In the example shown in FIG. 5 and the other drawings, the two columns (protrusions) 230, the two protrusion through-holes, and the two protrusion openings are provided. However, the vibration actuator 300 may be fixed to the display panel 100 with more than the two columns 230, the two protrusion through-holes, and the two protrusion openings. The columns 230 of the bracket 200 pass through the protrusion through-holes of the diaphragm 310 and are fitted into the protrusion openings of the spacer 400. The vibration actuator 300 is fixed by the columns 230 and the others. Thus, it is prevented that the vibration actuator 300 rotates in the z-direction (around the screw 500) as an axis of rotation. Further, when viewed from the z-direction, the columns 230 and the others are located on the line parallel to the x-direction through the center of the screw 500 such that distances from the center of the screw 500 to the two columns 230 are equal. Thus, the vibration of the diaphragm 310 can be evenly and effectively transmitted to the display panel 100.

Effects of the Second Embodiment

The display speaker 10 of this embodiment includes the display panel 100, the bracket 200, the vibration actuator 300, the spacer 400, and the screw 500. The vibration actuator 300 includes the diaphragm 310, the piezoelectric element 320, and the piezoelectric element 330. The bracket 200, the vibration actuator 300, and the spacer 400 are fixed to the display panel 100 with the screw 500. The screw 500 passes through the screw through-hole of the bracket 200, the screw through-hole of the vibration actuator 300, and the screw through-hole of the spacer 400. The diaphragm 310 and the screw 500 are not in contact with each other so that an electrical short-circuit can be prevented between the display panel 100 and the diaphragm 310. The upper surface of the bracket 200 and the lower surface of the spacer 400 face each other across the diaphragm 310. The bracket 200 includes the columns 230. The columns 230 pass through the protrusion through-holes of the diaphragm 310 and is fitted into the protrusion openings on the lower surface of the spacer 400. Thus, it is prevented that the vibration actuator 300 rotates around the shaft of the screw 500. In other words, the vibration actuator 300 can be surely fixed and positioned. Further, the distances from the two columns 230 of the bracket 200 to (the center of) the screw through-hole are equal to each other. When viewed from the z-direction, the columns 230 of the bracket 200, the protrusion through-holes of the diaphragm 310 of the vibration actuator 300, and the protrusion openings of the spacer 400 are arranged on the line parallel to the x-direction through the center of the screw 500. Thus, the vibration actuator 300 can evenly vibrate. The display speaker 10 can be vibrated effectively by the vibration actuator 300 vibrating evenly. The display speaker 10 can output high quality sound by the vibration actuator 300 vibrating evenly.

The embodiments of the invention are described above. However, those embodiments are only examples. The invention is not limited to those embodiments. Various modification and changes can be possible based on knowledge of those skilled in the art, without departing from the purpose of the claims.

While the invention has been shown and described in detail, the foregoing description is in all aspects illustrative and not restrictive. It is therefore understood that numerous other modifications and variations can be devised without departing from the scope of the invention.

What is claimed is:

1. A panel speaker comprising:

a panel;

a vibration actuator that vibrates the panel, the vibration actuator having first and second oppositely-facing surfaces, the first surface facing the panel;

a bracket that is located between the first surface of the vibration actuator and the panel;

a spacer that is located adjacent to the second surface of the vibration actuator, the spacer occupying a first area that is encompassed by a second area occupied by the bracket when the panel speaker is viewed in a direction that is perpendicular to a plane of the second surface; and a screw that passes through the spacer, the vibration actuator, and the bracket to fasten the spacer, the vibration actuator, and the bracket to the panel, wherein the vibration actuator, disposed between the bracket and the spacer, is fastened by the screw to the panel, one of the bracket and the spacer includes a protrusion, and the other of the bracket and the spacer includes a protrusion opening into which the protrusion is fitted, and the vibration actuator includes a protrusion through-hole through which the protrusion extends.

2. The panel speaker according to claim 1, wherein an external shape of a raised surface of the bracket is identical to an external shape of a surface of the spacer, the raised surface of the bracket and the surface of the spacer being in contact with the first and second surfaces, respectively, of the vibration actuator.

3. The panel speaker according to claim 1, wherein a material of the bracket is identical to a material of the spacer.

4. The panel speaker according to claim 1, wherein the one of the bracket and the panel includes two of the protrusions, and the other of the bracket and the panel includes two of the openings into which the two protrusions are fitted, and the two protrusions and the two openings are arranged along a direction in which deflection vibration of the vibration actuator is transmitted and are arranged symmetrically about the screw.

5. The panel speaker according to claim 1, wherein the bracket and the spacer are electrical insulators, and the vibration actuator is electrically insulated from the panel.

6. A panel speaker comprising:

a panel;

a vibration actuator that vibrates the panel, the vibration actuator having first and second oppositely-facing surfaces, the first surface facing the panel;

a bracket that is located between the first surface of the vibration actuator and the panel;

a spacer that is located adjacent to the second surface of the vibration actuator, the spacer occupying a first area that is encompassed by a second area occupied by the bracket when the panel speaker is viewed in a direction that is perpendicular to a plane of the second surface; and a screw that passes through the spacer, the vibration actuator, and the bracket to fasten the spacer, the vibration actuator, and the bracket to the panel, wherein the vibration actuator, disposed between the bracket and the spacer, is fastened by the screw to the panel, one of the bracket and the spacer includes two protrusions, and the other of the bracket and the spacer includes two protrusion openings into which the protrusions are fitted, the vibration actuator includes two protrusion through-holes through which the protrusions extend, and the two protrusions, the two protrusion openings, and the two protrusion through-holes are arranged along a direction in which deflection vibration of the vibration actuator is transmitted and are arranged symmetrically about the screw.

* * * * *